Patented July 9, 1935

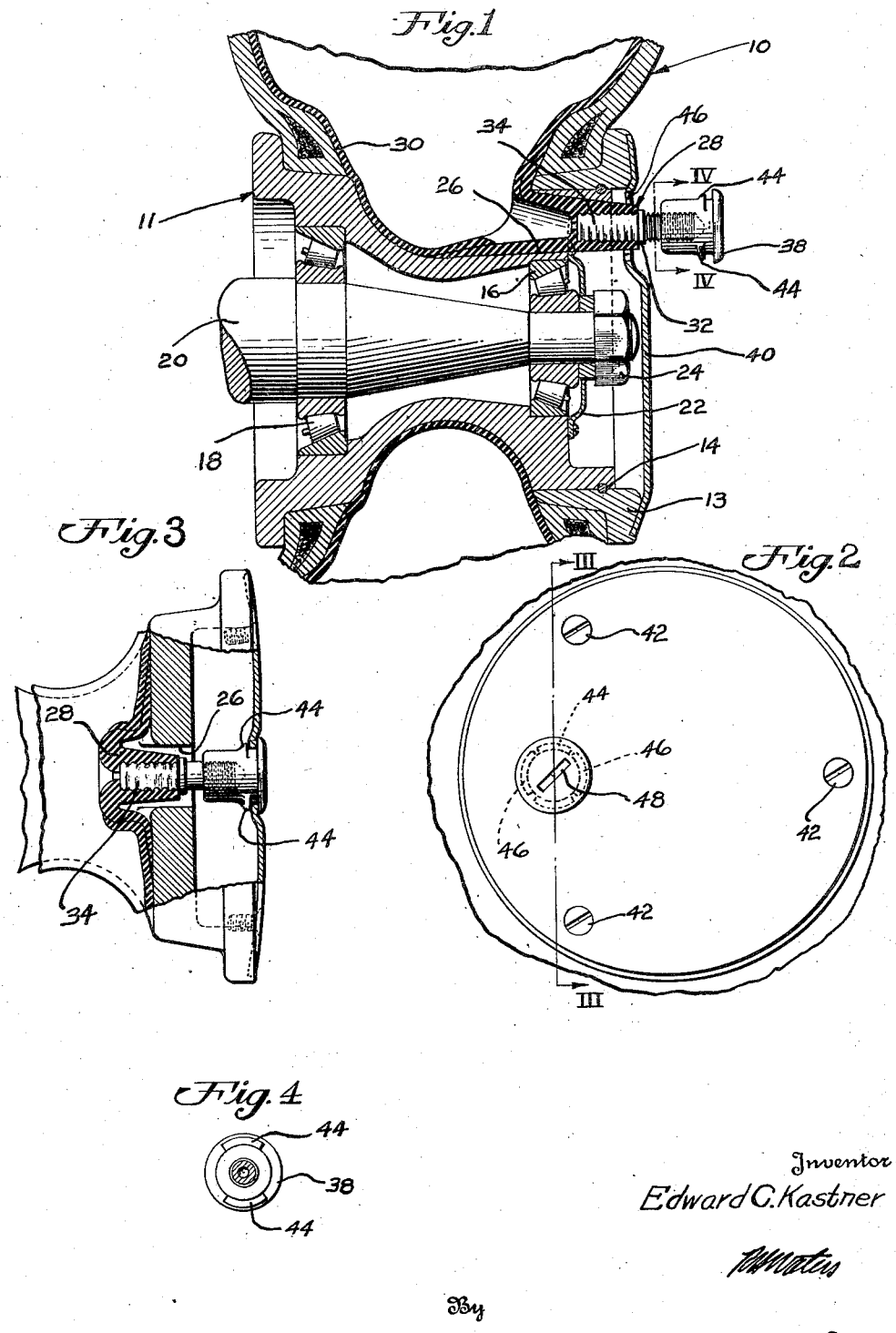

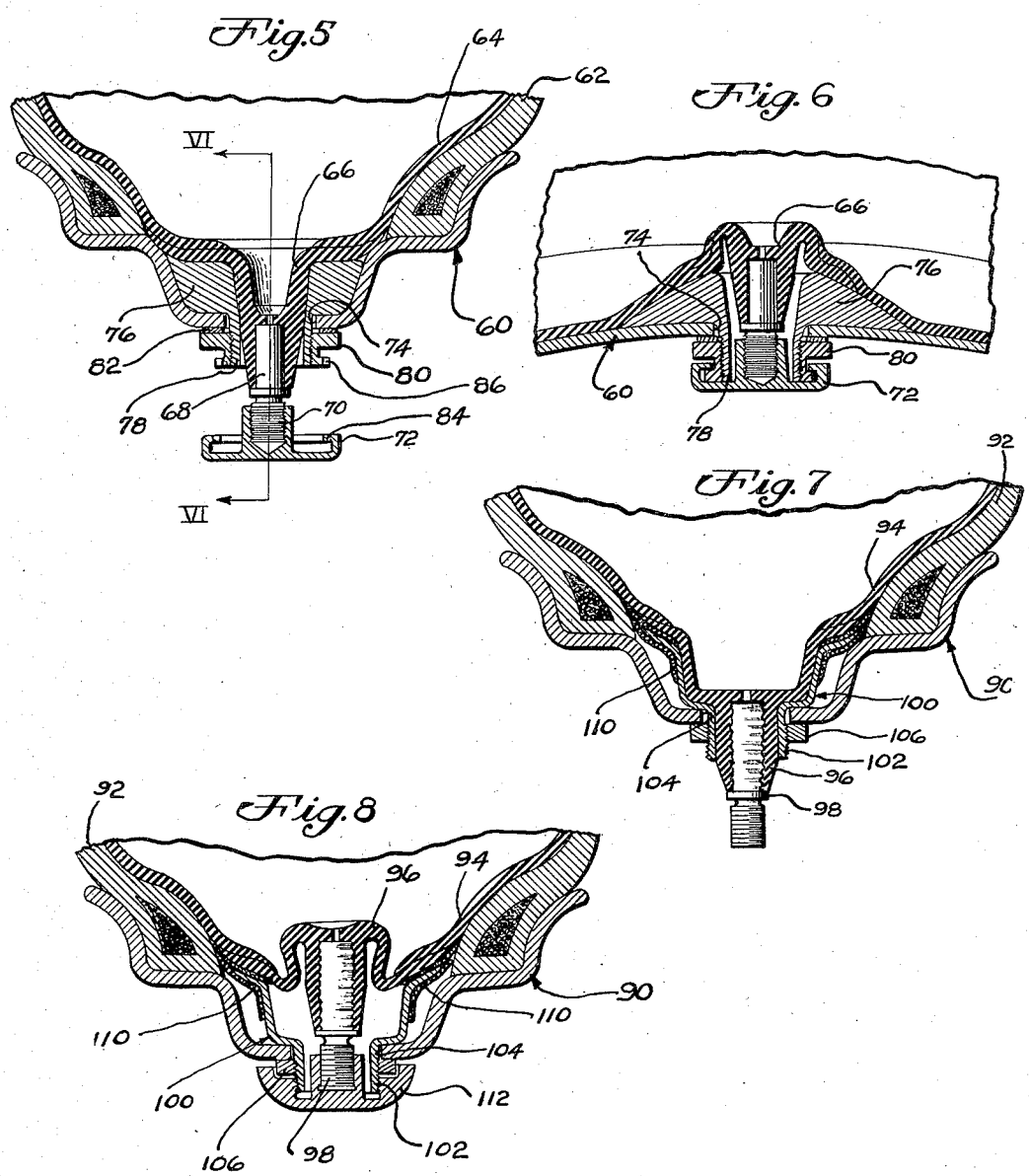

2,007,916

UNITED STATES PATENT OFFICE 2,007,916

RETRACTABLE VALVE STEM

Edward C. Kastner, Fairlawn, Ohio, assignor to Wingfoot Corporation, Akron, Ohio, a corporation of Delaware Application July 31, 1934, Serial No. 737,809

17 Claims. (Cl. 152—13)

This invention relates to tire, tube and wheel assemblies and is concerned with providing improved valve stems for inflating purposes, and more particularly is directed to making the valve stems retractable so that during use they do not extend out from the wheel assembly.

Heretofore in a tire, tube and wheel assembly, the inner tube valve stem has been extended through the wheel or tire-supporting hub in order that the tire and tube can be properly inflated. Prior to the present invention this extending type of stem was thought necessary, even though it presented an undesirable appearance in the tire assembly and, furthermore, was apt to catch on objects during the revolution of the tire assembly as, for example, picking up grass, mud or other foreign matter. In addition, on tire assemblies adapted for airplane use either as tail wheels or main landing wheels, the valve stems have ordinarily protruded so that they increase the resistance to the passing air as offered by the tire assembly. This increased resistance was particularly evident where the tire was of the super-balloon type and was mounted directly upon a supporting hub of very small diameter, thereby necessitating a laterally extending valve stem which ran out beyong the normal confines of the tire and wheel.

The foregoing and other difficulties of prior-known structures have been avoided and overcome in the present invention by the provision of a retractable valve stem which in its extended position will readily permit the inflation of the tire and tube but which can be readily retracted so that substantially the entire stem is inside of the tube, tire and rim whereby an improved wheel structure results.

Another object of the invention is to provide a retractable valve stem for a superballoon tire which mounts directly upon a supporting hub, with the valve stem being adapted to be extended for purposes of inflation but adapted to be retracted so as to lie completely within the hub assembly once the inflating operation has been achieved.

Another object of the invention is to provide an improved tire and tube mounting for use with a drop-center rim wherein the valve stem associated with the inner tube is adapted to be retracted substantially entirely within the rim, thereby materially improving the appearance of the assembly.

Another object of the invention is the provision of an inflatable airplane tire with the inflating tube and stem being adapted to be removably encased entirely within the wheel.

Another object of the invention is to provide an anti-fouling valve stem offering substantially no air resistance and having a materially improved appearance when associated with a tire, tube and wheel unit.

Another object of the invention is to provide a telescopic or disappearing means for inflating a tire and wheel assembly.

The foregoing and other objects of the invention are achieved in the embodiments of the invention about to be described and illustrated in the accompanying drawings wherein, Fig. 1 is a diametric cross-sectional view of an application of the invention to an airplane-type tire-and-wheel unit, with the valve stem being shown in the extended position.

Fig. 2 is an end elevation partly broken away of the wheel assembly seen in Fig. 1.

Fig. 3 is a cross-sectional view taken on line 3—3 of Fig. 2 but showing the valve stem in its retracted position.

Fig. 4 is a cross-sectional view taken on line 4—4 of Fig. 1.

Fig. 5 is a cross-sectional view partly broken away of another embodiment of the invention showing the application of the invention to a drop-center type of wheel with the valve stem being illustrated in its extended position.

Fig. 6 is a circumferential sectional view taken on line 6—6 of Fig. 5 but with the valve stem seen in its retracted position.

Fig. 7 is a cross-sectional view similar to Fig. 5 of still another embodiment of the invention as applied to drop-center rims. The valve stem has been illustrated in extended position.

Fig. 8 is a view similar to Fig. 7 but illustrates the valve stem in a retracted position held in place with a sealing cap.

It will be appreciated that the principles of the invention are applicable to many installations, however in accordance with the patent statutes one or more forms of the invention will be specifically described and illustrated. Inasmuch as the invention is particularly adapted for use with large cross-sectional and small-bead-diameter pneumatic tires which mount directly upon a small hub, this form of the invention has been selected for detailed description.

Referring to Figs. 1 to 4 of the drawings, the numeral 10 indicates generally a pneumatic tire of the so-called superballoon type which is mounted directly upon a comparatively small hub shown generally at 11. The hub 11 may include a removable flange 13 which is releasably secured as by lock means 14 thereon. The hub 11 may be mounted in any suitable manner as by bearings 16 and 18 on a fixed supporting shaft 20. A cover plate 22 and retaining nut 24 complete the hub and axle assembly.

Due to the small distance between the beads of the tire 10 it is necessary to extend the means for inflating the tire in a lateral or axial direction and for this purpose the hub 11 is provided with an axially directed aperture 26 which functions to receive the valve stem shown generally at 28 of an inner tube 30. From the drawings it will be seen that the valve stem 28 is made of rubber which is preferably integrally vulcanized with the main portion of the inner tube 30 and which is ordinarily made tapered in the manner illustrated. Secured at the outer end of the valve stem 28 is a metal valve 32 of usual construction having a stem portion 34 adapted to be fastened by vulcanization to the stem. The outer portion 36 of the metal valve is threaded and removably receives a metal cap 38.

In order to give an improved appearance to the wheel and to improve the stream-line contour of the wheel a cover plate 40 is removably secured by any suitable means such as screws 42 to the flange 13 of the hub assembly 11. The cover plate 40 is suitably apertured to allow the valve stem to extend therethrough and some suitable fastening means are provided to lock the cap 38 in the cover plate 40. This may be accomplished as illustrated in Figures 2, 3 and 4 by a bayonet slot connection between the designated parts. To this end the cap 38 is formed with lugs 44 and the cover plate is formed with suitable recesses 46 which allow the lugs to be passed through the aperture in the cover plate which receives the valve stem. A slot 48 is provided on the top of the cap 38 which permits the stem and cap to be rotated once the lugs 44 have been passed through the recesses 46. Rotation of the cap 38 will of course lock the cap in position in accordance with the principles of the usual bayonet slot connection.

Of course when the valve cap 38 is locked in the retracted position as just described the valve stem 28 will have telescoped or folded back on itself as seen in Fig. 3 so that the stem is largely within the confines of the hub and the tube itself. In order that the valve stem 28 will move directly from its extended position to its retracted position several factors become quite important. In the first place the tapered recess 26 in the tube through which the stem extends must be uniformly tapered at substantially the angle shown and the opening must be smooth and true. Otherwise sticking of the stem will result and the same will be difficult to retract when in use. A little soapstone around the valve stem has been found to assist in the proper retracting action. It should be appreciated that the tapers on the stem and in the recess 26 cooperate during the assembling of the tire, tube and hub and during the inflating of the tire to hold the valve stem in its place with a wedging clamping action. This action should not however be too great as it will interfere with the proper retracting of the stem.

Furthermore the rubber forming the valve stem must not be too thin or too thick. If too thin the internal air pressure in the tire will render a valve very difficult to retract due to the force of the rubber on the hub opening. On the other hand if the rubber is too thick it will be difficult to turn the valve back on itself as seen in Fig. 3, which is almost necessary to successful telescoping valve action. The drawings have illustrated the inner tube proper as having a rather large hole covered by the valve stem, however it should be appreciated that with the valve stem being vulcanized in position the opening in the inner tube proper can be varied within wide limits.

The operation of the form of the invention described above will be evident from the said description. However, briefly it should be understood that the tire, tube and wheel assembly is inflated with the valve stem in the extending position shown in Fig. 1 whereupon the valve cap 38 is threaded on and the entire stem retracted to the position seen in Figure 3. This action is accomplished by merely pushing or telescoping the valve stem back on itself and holding it in the telescoped position by the bayonet-looking connection between the valve cap 38 and the cover plate 40.

In the form of the invention seen in Figures 5 and 6, the inventive principles have been applied to a drop-center rim. The rim is indicated generally by the numeral 60 and serves to mount a pneumatic tire 62 and inner tube 64. The inner tube 64 has an integral rubber valve stem 66 formed with the usual metal portion 68 which in turn has a threaded end 70 upon which a cap 72 can be screwed. Valve stem 66 is shown as extending through a suitable aperture 74 in the rim 60.

For the purpose of providing a tapered aperture of some length in the rim 60 a breast block 76, preferably of metal, is provided in the wall of the rim 60 in alignment with the rim hole 74 and the breast may be secured in position as by providing a tubular extension 78 thereon which extends through the rim hole and which is threaded to receive a clamping nut 80 which may bear against a cushioning washer 82.

The valve stem is adapted to be held in a retracted position once the tire assembly has been inflated and this result may be achieved through the agency of a bayonet slot connection between the valve cap 72 and clamping nut 80. Lugs 84 can be provided to cooperate with suitable recesses 86 on the retaining nut 78 to serve this end.

Fig. 6 illustrates the valve assembly seen in Fig. 5 but with the stem in a retracted position. This figure indicates the cooperation between the valve cap 72 and the breast-block retaining nut 80 and likewise illustrates how the tapered bore through the breast block allows the tapered valve stem 66 to move inwardly into the inner tube as well as serving to hold the stem in a lightly wedged relation when in the extended position.

The operation of this form of the invention will be quite evident from the preceding description. Suffice it to say that the tube is inflated with the stem in an extended position after which the stem is telescoped on itself and locked at its innermost retracted position.

The form of the invention seen in Figures 7 and 8 differs from that described heretofore and illustrated in Figures 5 and 6 only in that the breast block 76 has been replaced with a metal cup suitably cushioned by rubberized fabric strips. Referring more definitely to Figs. 7 and 8, the rim has now been indicated by the numeral 90, the tire by 92 and the inner tube by 94. The inner tube 94 is provided with a valve stem 96 having the usual metal portion 98. The referred-to cup is seen generally at 100 and includes a threaded neck 102 which extends through the usual rim hole 104, which permits the cup 100 to be tightly secured in proper position with the aid of a nut 106. The edges of the cup 100 are preferably covered with rubberized fabric 110. The cup 100 may be substantially round in diameter to provide a tapered bore for the reception of the valve stem 96 and to properly function to allow the valve stem to be retracted or telescoped as seen in Fig. 8. Or again, the cup may be tapered off in a circumferential direction to somewhat more closely approximate the shape of the breast shown in Fig. 6 of the drawings.

The valve stem 96 is adapted to be held in its retracted position through the agency of any suitable means such as a cap 112. This cap is preferably tapped to screw onto both the threaded part of the metal stem 98 and likewise to the threaded end 102 of the metal cup 100. This double seal insures keeping all foreign material from the inside of the tube, tire and rim assembly and likewise affords better protection against leakage of air around the valve.

The operation of this last-described form of the invention is similar to that heretofore described in conjunction with Figs. 1 to 6.

It will be recognized from the attached description and drawings that a novel improvement has been made in the tire industry by the provision of a valve stem which can be readily retracted to provide an anti-fouling, stream-lined tire unit, in which the improved position of the stem results in a much better looking assembly. Furthermore the valve stem is protected against wear and chafing and all foreign matter is excluded from the interior of the tube, tire and wheel.

While several forms of the invention have been illustrated and described in detail, it should be appreciated that the invention is not limited thereby or thereto but that the scope of the invention is properly determined by the appended claims.

What I claim is:

1. In combination a pneumatic tire, an inner tube in the tire and adapted to inflate the same, rotatable means mounting the tire and tube and a retractable valve stem on the inner tube for inflating the tube and extending through the rotatable means, said stem being adapted to be extended to an inflating position and also moved axially inwardly of the rotatable means and inner tube to a retracted position and mechanism on the rotatable means for holding the valve stem in its retracted position.

2. In combination a pneumatic tire, an inner tube in the tire and adapted to inflate the same, rotatable means mounting the tire and tube and a retractable valve stem on the inner tube for inflating the tube, said stem being adapted to be extended to an inflating position and also moved axially to a retracted position within said inner tube and mechanism on the rotatable means for holding the valve stem in its retracted position.

3. In combination a pneumatic tire, an inner tube in the tire and adapted to inflate the same, rotatable means mounting the tire and tube, and a retractable valve stem on the inner tube for inflating the tube, said stem being adapted to be extended to an inflating position and also moved axially inwardly of the rotatable means and inner tube to a retracted position and mechanism for holding the valve stem in its retracted position.

4. The combination with an inflatable tire and a wheel for mounting the tire of a stem for permitting inflation of the tire, and means for holding the stem in either a retracted position within said tire or extended position.

5. An assembly including a pneumatic tire of relatively large cross-sectional dimensions but small bead diameters, an inner tube in the tire, a hub directly mounting the tire and tube for rotation, a tapered valve stem on the inner tube extending substantially horizontally through a suitable aperture in the hub to an inflating position, said stem being adapted to be telescoped on itself in the assembly to a retracted position, a cap on the valve stem and cooperating means on the hub and cap for locking the stem in its retracted position.

6. An assembly including a pneumatic tire of relatively large cross-sectional dimensions but small bead diameters, an inner tube in the tire, a hub directly mounting the tire and tube for rotation, a tapered valve stem on the inner tube extending substantially horizontally through a suitable aperture in the hub to an inflating position, said stem being adapted to be pushed back on itself in the assembly to a retracted position, and means on the hub for locking the stem in its retracted position.

7. An assembly including a pneumatic tire of relatively large cross-sectional dimensions but small bead diameters, an inner tube in the tire, a hub directly mounting the tire and tube for rotation, a valve stem on the inner tube extending through a suitable aperture in the hub to an inflating position, said stem being adapted to be pushed back in the assembly to a retracted position and means for locking the stem in its retracted position.

8. An assembly including a pneumatic tire, an inner tube in the tire, a rotatable member directly mounting the tire and tube for rotation, a tapered valve stem on the inner tube extending substantially axially through a suitable aperture in the rotatable member to an inflating position, said stem being adapted to be telescoped on itself in the assembly to a retracted position, and means on the rotatable member for locking the stem in its retracted position.

9. In a wheel assembly, a pneumatic tire, an inner tube and a drop-center rim mounting the tire and tube, a tapered valve stem on the tube extending through an aperture in the rim, a breast block secured to the rim and surrounding and guiding the stem in its passage through the rim, said block providing a tapered aperture for normally exerting a wedging and holding action on the stem in its extended inflating position, said valve stem being designed to be telescoped back to a retracted position within said aperture and tube and means for positively holding the stem in said retracted position.

10. In a wheel assembly, a pneumatic tire, an inner tube and a rim mounting the tire and tube, a valve stem on the tube extending through an aperture in the rim, guide means secured to the rim and surrounding and guiding the stem in its passage through the rim, said guide means providing a tapered aperture for normally exerting a wedging and holding action on the stem in its extended inflating position, said valve stem being designed to move radially inwardly to a retracted position and means for positively holding the stem in said position.

11. In a wheel assembly, a pneumatic tire, an inner tube and a rim mounting the tire and tube, a tapered valve stem on the tube extending through an aperture in the rim, and a breast block secured to the rim and surrounding and guiding the stem in its passage through the rim, said block providing a tapered aperture for normally exerting a wedging and holding action on the stem in its extended inflating position.

12. A retractable valve tire assembly including a pneumatic tire, an inner tube, rotatable means mounting the tire and tube, a rubber valve stem on the tube and adapted to extend through the rotatable means for inflation purposes or to be telescoped back on itself in a retracted position, and a cup on the rotatable means for receiving and guiding the valve stem through the rotatable means, said cup being of metal and fabric and means having a locking connection with the valve stem and the cup for holding the stem in its retracted position during the usual operation of the tire assembly.

13. A retractable valve tire assembly including a pneumatic tire, an inner tube, rotatable means mounting the tire and tube, a rubber valve stem on the tube and adapted to extend through the rotatable means for inflation purposes, or to be telescoped back on itself in a retracted position, a cup on the rotatable means for receiving and guiding the valve stem through the rotatable means, and means for holding the stem in a retracted position during the operation of the tire assembly.

14. A retractable valve tire assembly including a pneumatic tire, an inner tube, rotatable means mounting the tire and tube, a rubber valve stem on the tube and adapted to extend through the rotatable means for inflation purposes, or to be telescoped back on itself in a retracted position, and a cup on the rotatable means for receiving and guiding the valve stem through the rotatable means.

15. In combination, a tire, a tube and a wheel, an inflating valve stem on the tube, clamping means for holding the stem in a clamped, extended position during tire, tube and wheel assembling and inflating operations and means for locking the stem in a retracted position out of contact with said clamping means during the usual use of the assembly.

16. In combination a pneumatic tire, an inner tube in the tire and adapted to inflate the same, a rim mounting the tire and tube, a valve stem on the tube and adapted to be extended through the rim to an inflating position and retracted therethrough to a position at least partially within the inner tube when the latter is inflated, and means on the rim for maintaining the valve stem in such retracted position.

17. In combination a pneumatic tire, an inner tube in the tire and adapted to inflate the same, a rim mounting the tire and tube, a valve stem on the tube and adapted to be extended through the rim to an inflating position and retracted therethrough to a position wholly within the inner tube when the latter is inflated, and means on the rim for maintaining the valve stem in such retracted position.

EDWARD C. KASTNER.